H.C. Storrs' Impt. on Locks or Latch Bolts.

No. 3429

Reissued May 11 1869

Witnesses.

J. Manly

E.W. Reed

H. C. Storrs

United States Patent Office.

H. C. STORRS, OF NEW YORK, N. Y.

*Letters Patent No.* 73,666, *dated January* 21, 1868; *reissue No.* 3,429, *dated May* 11, 1869.

IMPROVEMENT IN KNOB-LATCHES.

The Schedule referred to in these Letters Patent and making part of the same.

*To all whom it may concern:*

Be it known that I, H. C. STORRS, of New York, in the county of New York, and State of New York, have invented a new Improvement in Locking-Knob Latches; and I do hereby declare the following, when taken in connection with the accompanying drawings, and the letters of reference marked thereon, to be a full, clear, and exact description of the same, and which said drawings constitute part of this specification, and represent, in—

Figure 1:
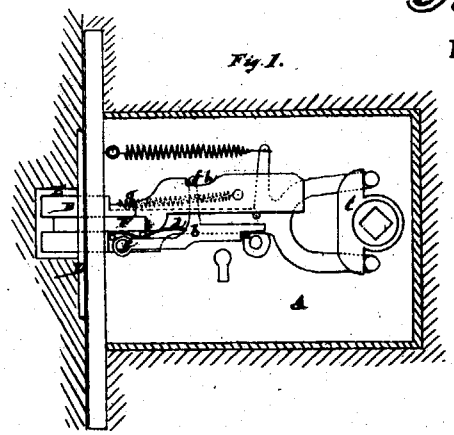
Figure 2:
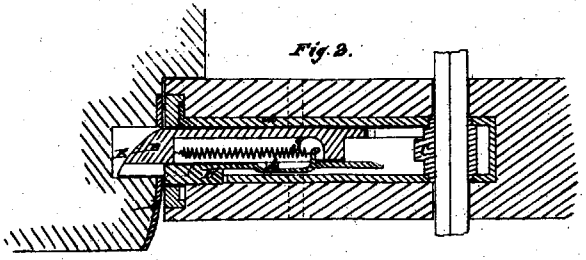

Figure 1, an interior view of the case, showing the mechanism of the case or lock; and in Figure 2, a longitudinal section through the latch-bolt.

This invention relates to an improvement in knob-latches, such that, by closing the door, the bolt is caused to spring into the keeper provided on the jamb for the purpose.

In this class of latches it is customary to place a second bolt, slide, or catch, to prevent the opening of the door, but in all such constructions this locking-device has been independent of the latch-bolt, and requires a distinct and separate manipulation, which being neglected or omitted, the door is left unsecured.

The object of this invention is to overcome these difficulties, and consists in combining, with the latch-bolt, a device which, while it does not interfere with the inward and afterward outward shooting of the bolt, as in closing the door, operates automatically by the said movement, closing the door to lock the latch-bolt, so that the latter cannot be shot back to open the door without first releasing the latch-bolt from the hold of the locking-bolt by a special contrivance for the purpose, as the key, or knob properly belonging to the latch.

While my invention is capable of various modifications, or different constructions, the arrangement represented in the accompanying drawings will suffice to explain; therefore, to the better understanding of this invention, I will fully describe the same as illustrated in the accompanying drawings.

A is the latch-case, constructed in the usual manner, for the reception of the mechanism of the latch.

B, the latch-bolt.

C, the hub, operated by a spindle and knobs, in the usual manner, to draw back the bolt, the bolt being shot out or forward by a spring within the case, so that when the door is closed, the bolt will shoot into the keeper E, its bevelled nose passing over the plate or edge D of the keeper, all as in keepers of common construction.

Combined with the latch-bolt B, I arrange a sliding bolt, F, so that when the door is open, the sliding bolt F will be forced out by a spring, but so that when the door is closed, the said bolt F will strike the keeper, or some point convenient thereto, be forced into the case, and there held, the keeper not permitting the said bolt F to shoot out.

The bolt B flies into the keeper, or recess E, and causes an arm, *b*, of a lever, pivoted to the latch-bolt at *c*, and controlled by a spring, *d*, to shoot into lock with a stop, *e*.

In this position, which is as shown in fig. 1, the latch-bolt is prevented from being forced inward, except by the introduction of a key, or other special device, to lift the arm *b* from the stop *e*.

When the arm *b* is so raised, and the latch-bolt drawn back, the arm slides back with the bolt B clear of the stop *e*. In this position the door is open, and the bolt F flies out.

In the bolt F is an incline, *h*, which, as the bolt F flies out, will pass under a projection, *f*, on the arm *b* of the lever, and hold up the lever so that it cannot fall into lock with the stop *e*, but whenever the bolt F is forced inward, and the latch-bolt B remains out, then the latch-bolt cannot be moved except by the device specially prepared for the purpose; and the bolt F must always be forced inward, and held when the door is closed, consequently closing the door automatically, and positively locking the latch-bolt, so that it cannot be opened, except as before described.

Having fully described this invention,

What I claim as new and useful, and desire to secure by Letters Patent, is—

1. The combination of the sliding bolt F with the latch-bolt B, arranged so that by the closing of the door, both bolts are forced inward, the bolt F retained within the case; the bolt B shooting into the keeper is locked through the instrumentality of the bolt F, substantially as herein set forth.

2. The combination of the locking-bar *b*, pivoted to the latch-bolt, with the bolt F and latch-bolt B, substantially as shown and described.

H. C. STORRS.

Witnesses:
D. F. BRIGHAM,
P. H. BIGELOW.